April 18, 1961 L. ALHERITIERE ET AL 2,980,731
PROCESS FOR CONTACTING SOLID AND LIQUID PHASES
Filed March 10, 1958
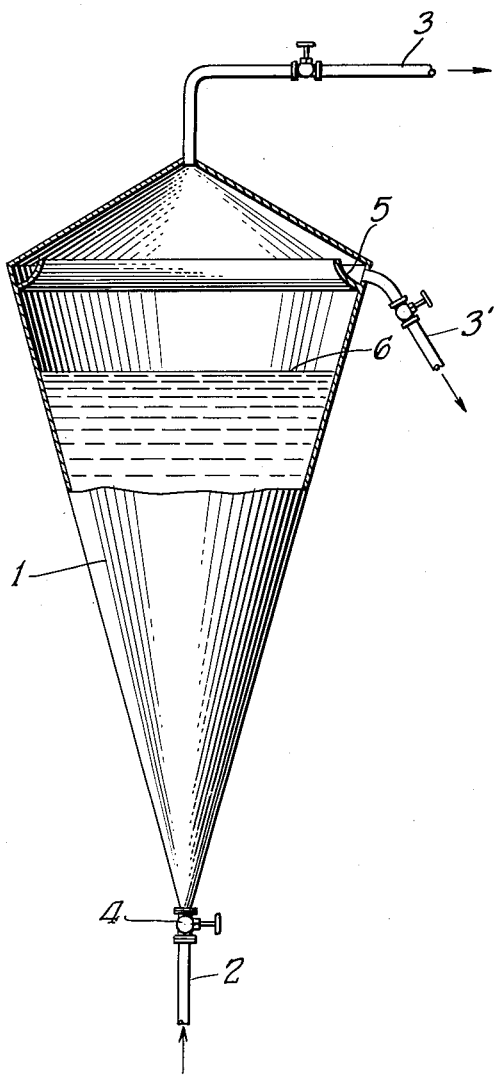
INVENTORS.
LOUIS ALHERITIERE.
BY JULES MERCIER.
ATTORNEYS.

2,980,731
PROCESS FOR CONTACTING SOLID AND LIQUID PHASES

Louis Alheritiere and Jules Mercier, Melle, France, assignors to Les Usines de Melle (Societe Anonyme), Deux-Sevres, France, a corporation of France Filed Mar. 10, 1958, Ser. No. 720,358

Claims priority, application France Mar. 21, 1957

9 Claims. (Cl. 260—488)

This invention relates to an apparatus for contacting solid and liquid phases, particularly solid catalyst with a liquid reagent; and to a process for carrying out a liquid phase reaction in the presence of a solid catalyst.

Intimately contacting a liquid phase with a solid phase is an apparently simple operation, but one which in actual practice involves numerous problems to which no general solution has been found.

Moreover, the problem of separating the solid from the liquid arises at the end of the reaction. The use of solid catalysts in liquid phase reactions such as esterification, hydrolysis, condensation, hydration, epoxidation, and many others, has greatly increased since ion exchange resins have been commercially available in the form of powders having known, definite particle size.

The best methods used up to now for operating with ion exchangers are based on the fixed-bed principle, which consists in passing the compounds to be reacted downwards through a catalyst bed having a constant cross-section.

Apparatus operated in accordance with this principle requires, at the base of the reaction zone, a rather complex device for separating, at the end of the reaction, the reaction products from the catalyst; this device comprises screens, porous plates and the like.

The fixed bed operates satisfactorily where clean starting materials, free of suspended substances, are dealt with, and where the operating conditions are such that no evolution of gaseous or vaporous products occurs. But this technique is no longer suitable if these conditions are not met. Suspended substances rapidly clog the catalyst-retaining device and/or the catalyst itself, and impede the flow of the liquid through the catalyst bed up to the point of stopping it completely.

Evolution of even a small volume of gaseous phase results in formation of gas bubbies and pockets which may develop so far as to divide the catalyst bed into separate sections. These gas pockets cannot be expelled, owing to the descending flow of liquid reactants, and eventually block the reactor.

The suspended-bed principle, involving a vertical, suspended catalyst bed having a constant cross-section, delays the above-mentioned inconveniences but does not avoid them. Clogging of the support by the suspended substances may still occur. Division of the catalyst bed by gas or vapor pockets is even increased so far as to allow the sections so formed to be ejected out of the reactor.

The principal objects of the invention are to provide an apparatus of the kind described, which shall at least in part avoid the difficulties above described; and to provide a simple, efficient process for carrying out liquid phase reactions in the presence of a solid catalyst.

The apparatus comprises in combination a reaction vessel for a charge of solid catalyst having its inner cross-section increased from bottom to top. Such a vessel is most conveniently shaped as an inverted cone or frustum having its vertex below. The vessel is fitted with means for continuously flowing a liquid reactant upwardly through the vessel and through the solid catalyst therein contained. An exit means is also provided for flowing the reacted liquid continuously from the vessel.

In carrying out the process of my invention for reaction of a liquid phase in the presence of a solid catalyst, I provide a cone-shaped bed of catalyst in an inverted conical zone. That is, the catalyst bed increases in cross-section from the bottom to the top. Above the catalyst bed a zone is provided into which liquid passing through the bed may collect. The liquid is admitted at the inverted apex of the conical zone beneath the catalyst bed. The liquid reacts as it passes through the catalyst bed into the zone thereabove. The clear reacted liquid above the zone is then withdrawn from above the catalyst bed.

In the accompanying drawing forming part of this application the figure shows, partly in section, an elevation of a preferred form of apparatus in accordance with my invention.

Reactor 1 is filled with solid catalyst up to level 6, so as to keep in the reactor, above this level, a catalyst-free zone. The reactants are continuously introduced into vessel 1 by a pipe 2 and a cock 4. When the operation is stopped, cock 4 is shut off for retaining the catalyst within vessel 1.

The vertex angle of the cone or frustum may vary from about 5° to 60°. The reaction products are withdrawn by a pipe 3 or alternatively by a pipe 3' fed from an annular gutter 5 which may be provided inside the reactor and into which the liquid overflows.

In carrying out the process of my invention for liquid phase reaction with a solid catalyst, the speed of the liquid flow through the bed progressively decreases from the bottom to the top of the reaction zone, due to the conic shape of the reactor. Consequently the expansion of the catalyst bed, which is a function of the speed, also decreases from the bottom to the top of the said zone.

The feed of liquid to the base of the reactor is so controlled, with respect to the kind and particle size of the catalyst, as to provide a linear speed of liquid amounting to 10–30 times the speed of fall of the catalyst particles in the liquid, this speed of fall being defined by the Stokes law. For example, with a sulfonic polystyrene resin catalyst, the particles of which have a diameter of 0.1–1 millimeter, it is advisable to provide a liquid linear speed at the base of the reactor of the order of 1.5–3 meters per second.

The vertex angle of the cone or frustum is such that the linear speed of the liquid in the upper part of the reactor becomes lower than the speed of fall of the solid particles, so that any loss of catalyst by entrainment is avoided. This vertex angle, as above stated, depending on the cases, may vary from 5° to 60°.

Under these conditions, in normal run the whole of the catalyst is maintained in suspension in the liquid. Two zones, the one at the base of the reactor and the other at the upper part thereof, are free from catalyst.

The invention offers numerous advantages:

First, gas or vapor evolution is no more an inconvenience. The bubbles have no tendency to agglomerate and form gas pockets, but on the contrary leave the apparatus easily.

Moreover, the suspended catalyst is constantly maintained in a turbulent state, which favors the material and heat exchanges. This turbulence also permits carrying out reactions with heterogeneous liquid mixtures, and favors removal of suspended impurities.

Furthermore, the conic shape permits employing catalysts having non-uniform particle size, the particles in this case ranking themselves in the reactor in different beds, according to their different sizes.

It is generally known that the necessary time of contact of the reactants with the catalyst can be determined by integrating the kinetic equations of the reaction. Assuming in all cases that the contact of the reactants with one another and with the catalyst is perfect, a batchwise operated apparatus involves the shortest contact time for obtaining a given result. On the contrary, one-stage continuous apparatus, that is to say one in which the whole of the reactants, catalyst and reaction products is homogenized to the optimum extent, involves the longest contact time.

Increasing the number of stages in a continuous plant results in shortening the contact time. At the limit, for an infinite number of stages, the contact time becomes comparable with the contact time in a batch apparatus.

The apparatus of this invention behaves like a continuous apparatus comprising a great number of stages, the time required for obtaining a given result being only very slightly above that required in a batch apparatus.

Accordingly, the rate of feed of the reactants is preferably so controlled that the total time of contact with the catalyst be a little above (say 1.3 to 1.5 times) the contact time required in a batch apparatus for obtaining the desired result.

Generally it is desirable to attain the thermo-dynamic equilibrium for the temperature and pressure conditions used, which equilibrium depends primarily upon the molar ratio between the reactants.

Since the invention may be used for carrying out numerous various reactions, it is not possible to specify any value of this molar ratio, which depends to a large extent upon the methods contemplated for subsequent separation of the reaction products.

It may even be advisable, in certain cases, to recycle to the reactor a portion of the reaction products with a view to facilitating separation problems. In such cases one should take into account the resulting alteration of the equilibrium conditions for calculating the contact time required.

The invention may be operated at a pressure different from atmospheric, and with or without heating or cooling. Heat exchange may be provided, if desired, by means of an external jacket or of an internal coil, with circulation of heat exchange fluid. The turbulent state of the catalyst allows such heat exchange to be realized, which is a difficult problem in the fixed-bed method.

The following examples illustrate processes of this invention employing the apparatus thereof.

EXAMPLE 1

Hydrolysis of methylacetate

To the base of the conic reactor as above described, having a vertex angle of 18° and a total capacity of 2500 liters, charged with 1500 liters of sulfonic polystyrene resin catalyst "Allassion CS," product of Company A.C.F.I. (Auxiliaire des Chemins de Fer et de l'Industrie), having a particle size of 0.1–1 millimeter, there was continuously fed a boiling heterogeneous mixture consisting of:

1260 kg. per hour of methyl acetate and
480 kg. per hour of water

The absolute pressure in the reactor was maintained at 3.5 kg./cm.$^2$.

Conversion of the ester was fixed at 27% and remained at this value after 3500 hours running, without any decrease in activity of the catalyst. The yield amounted to substantially 100%.

The same results were obtained using as a catalyst an "Amberlite IR 120" resin, a product of Rohm & Haas Company.

EXAMPLE 2

Manufacture of butyl acetate

To the base of the conic reactor as above described, made of stainless steel and having a vertex angle of 20° and a total capacity of 1600 liters, charged with 1300 liters (measured under water) of a cation exchange resin in its hydrogen form (such as used in Example 1), having particle size of 0.3–0.8 millimeters, the total volume of which decreased to 700 liters in the reaction medium used, there was fed 9000 liters per hour of a pre-heated liquid mixture having the following composition:

| | Percent by weight |
|---|---|
| Acetic acid | 30 |
| Butyl acetate | 55 |
| Butyl alcohol | 13.8 |
| Water | 1.2 |

The temperature at the point of entrance into the reactor was 110° C. and the reactor was maintained under an absolute pressure of 3 kg./cm.$^2$. The composition of the mixture leaving the reactor was as follows:

| | Percent by weight |
|---|---|
| Acetic acid | 26 |
| Butyl acetate | 62.7 |
| Butyl alcohol | 9 |
| Water | 2.3 |

The last named mixture was fed to a heated vessel surmounted by a distillation column from the head of which there was withdrawn, per hour, 564 kg. of butyl acetate and 85.4 kg. of water. This vessel was also fed, per hour, with 290 kg. of acetic acid and 359 kg. of butyl alcohol. Under these conditions, the liquid withdrawn from the base of the column had the composition of the first named mixture, and served to feed the reactor.

The yield amounted to substantially 100%, provided that the reactants used are pure.

No decrease in activity of the catalyst was found after 2000 hours running. The plant produced a regular output of 13,500 kg. of pure butyl acetate per day.

EXAMPLE 3

Manufacture of mesityl oxide

To the base of the conic reactor as above described, having a vertex angle of 18° and a total capacity of 1.4 liters, filled with 200 cubic centimeters of "Allassion CS" (as in Example 1), having a particle size of 0.05–2 millimeters, there was fed 1500 cubic centimeters per hour of anhydrous, pure acetone. A temperature of 90° C. was maintained, 10% of the acetone was converted, the mesityl oxide yield being between 85% and 92%.

EXAMPLE 4

Saccharose hydrolysis

To the base of the conic reactor as above described, having a vertex angle of 40° and a total capacity of 4 liters, charged with 2 liters of "Allassion CS" (as in Example 1) having a particle size of 0.1–1.5 millimeters, there was fed 1.5 liters per hour of a 40% saccharose aqueous solution. The temperature was maintained at 60–75° C. During operation the resin swelled and occupied a volume of 2.36 liters.

Conversion of the saccharose into glucose and laevulose reached 100%.

Examples 3 and 4 above were conducted at atmospheric pressure.

We claim:
1. A process for carrying out a liquid phase reaction in the presence of a solid catalyst, which comprises providing a cone shaped bed of solid catalyst in an inverted conical zone, feeding a liquid reactant at a temperature sufficient to produce gas in said bed, at the inverted apex of the conical zone beneath the catalyst bed and passing it through the bed at a linear speed greater than the speed of fall of the solid catalyst particles of said bed in the liquid and which near the top of the bed becomes lower than said speed of fall of the solid catalyst particles, thereby to suspend the catalyst particles in the liquid while avoiding loss by entrainment of catalyst in liquid at the top of said catalyst bed.

2. A process for carrying on a liquid phase reaction in the presence of a solid catalyst which comprises providing a cone shaped bed of catalyst in an inverted conical zone, providing a catalyst-free space in the zone above the catalyst bed, admitting a liquid at a temperature sufficient to produce gas in said bed, at the inverted apex of said conical zone beneath the catalyst bed, passing it through the bed at a linear speed greater than the speed of fall of the solid catalyst particles of said bed in the liquid and which near the top of the bed becomes lower than said speed of fall of the solid catalyst particles, reacting the liquid as it passes through the catalyst bed into the zone thereabove, and withdrawing substantially clear reacted liquid from above said catalyst bed.

3. A process for carrying out a liquid phase reaction in the presence of a solid catalyst, which comprises providing a cone shaped bed of solid catalyst in an inverted conical zone, feeding a liquid reactant at a temperature of about 60° C. to about 110° C. at the inverted apex of the conical zone beneath the catalyst bed sufficient to form a gas in the bed and passing it through the bed at a linear speed greater than the speed of fall of the solid catalyst particles of said bed in the liquid and which near the top of the bed becomes lower than said speed of fall of the solid catalyst particles, thereby to suspend the catalyst particles in the liquid while avoiding loss of entrainment of catalyst in liquid at the top of said catalyst bed.

4. A process for carrying out a liquid phase reaction in the presence of a solid catalyst, which comprises providing a cone-shaped bed of catalyst in an inverted conical zone, providing a catalyst-free space in the zone above the conical bed of catalyst, admitting a liquid at a temperature sufficient to produce gas in said bed, at the inverted apex of said conical zone beneath the catalyst bed, said liquid having a linear speed, at said apex, of about 10-30 times the speed of fall of the solid particles of catalyst in said liquid, reacting the liquid as it passes through the catalyst bed into the zone thereabove, and withdrawing substantially clear reacted liquid from above said catalyst bed.

5. A process for carrying out a liquid phase reaction in the presence of a solid catalyst, which comprises providing a cone-shaped bed of catalyst in an inverted conical zone, said catalyst consisting of a solid ion exchange resin of which the particles have a diameter of 0.1-1 millimeter, providing a catalyst-free space in the zone above the conical bed of catalyst, admitting a liquid at a temperature sufficient to produce gas in said bed, at the inverted apex of said conical zone beneath the catalyst bed, said liquid having a linear speed, at said apex, of about 10-30 times the speed of fall of the solid particles of catalyst in said liquid, reacting the liquid as it passes through the catalyst bed into the zone thereabove, and withdrawing substantially clear reacted liquid from above said catalyst bed.

6. A process which comprises providing an inverted cone-shaped bed of solid cation exchange resin catalyst having a particle size of about 0.1–1 millimeter in an inverted conical zone, providing a catalyst-free space in the zone above the conical bed of catalyst, introducing a heated mixture of methyl acetate and water at a temperature sufficient to produce gas in said bed, below the inverted apex of the bed under pressure, said mixture having a linear speed, at the apex of said conical bed, in the range of about 1.5 to 3 meters per second, hydrolyzing the methyl acetate as the mixture flows upwardly through the bed, and withdrawing substantially clear hydrolyzed product from above said bed.

7. A process which comprises providing an inverted cone-shaped bed of solid cation exchange resin catalyst of about 0.3–0.8 millimeters particle size in an inverted conical zone, providing a catalyst-free space in the zone above the conical bed of catalyst, introducing a heated mixture of acetic acid, butyl acetate, butyl alcohol and water at a temperature sufficient to produce gas in said bed, below the inverted apex of the bed under pressure, said mixture having a linear speed, at the apex of said conical bed, in the range of about 1.5 to 3 meters per second, acetylizing the butyl alcohol as the mixture flows upwardly through the bed, and withdrawing substantially clear reacted product from above said bed.

8. A process which comprises providing an inverted cone-shaped bed of solid cation exchange resin catalyst of about 0.05–2 millimeters particle size in an inverted conical zone, providing a catalyst-free space in the zone above the conical bed of catalyst, introducing heated anhydrous acetone at a temperature sufficient to produce gas in said bed, below the inverted apex of the bed under pressure, said acetone having a linear speed, at the apex of said conical bed, in the range of about 1.5 to 3 meters per second, producing mesityl oxide as the mixture flows upwardly through said bed, and withdrawing substantially clear mesityl oxide from above said bed.

9. A process which comprises providing an inverted cone-shaped bed of solid cation exchange resin catalyst of approximately 0.1–1.5 millimeters particle size in an inverted conical zone, providing a catalyst-free space in the zone above the conical bed of catalyst, introducing heated aqueous saccharose solution at a temperature sufficient to produce gas in said bed, below the inverted apex of the bed, said solution having a linear speed at the apex of said conical bed, in the range of about 1.5 to 3 meters per second, hydrolyzing the saccharose mixture as it flows upwardly through the bed, and withdrawing substantially clear glucose and laevulose solution from above said bed.

References Cited in the file of this patent

UNITED STATES PATENTS

| Number | Name | Date |
|---|---|---|
| 495,313 | Devraux | Apr. 11, 1893 |
| 1,671,864 | Higgins | May 29, 1928 |
| 1,892,760 | Burnham | Jan. 3, 1933 |
| 1,992,090 | Pestalozza | Feb. 19, 1935 |
| 2,272,026 | Spaulding | Feb. 3, 1942 |
| 2,438,029 | Atwell | Mar. 16, 1948 |
| 2,536,099 | Schleicher | Jan. 2, 1951 |
| 2,678,332 | Cottle | May 11, 1954 |
| 2,740,752 | Anhorn | Apr. 3, 1956 |

FOREIGN PATENTS

| Number | Country | Date |
|---|---|---|
| 552,336 | Great Britain | Apr. 2, 1943 |
| 714,665 | Great Britain | Sept. 1, 1954 |
| 741,098 | Great Britain | Nov. 23, 1955 |

OTHER REFERENCES

Astle et al.: Ind. Eng. Chem. 44, 2870 (1952).

Nachod et al.: "Ion Exchange Technology," 1956, page 280.